United States Patent [19]

Dean, III

[11] 3,813,471

[45] May 28, 1974

[54] SPELL AND LEARN EDUCATIONAL TOY

[76] Inventor: Clarence T. Dean, III, P.O. Box 732, Cambridge, Md. 21613

[22] Filed: Feb. 26, 1973

[21] Appl. No.: 335,938

[52] U.S. Cl. .................................... 35/35 H, 35/73
[51] Int. Cl. ............................................. G09b 1/04
[58] Field of Search............ 35/35 R, 35 H, 35 J, 69, 35/70, 71, 72, 73

[56] References Cited
UNITED STATES PATENTS
3,500,555 3/1970 Best .................................. 35/73 X Primary Examiner—Wm. H. Grieb

[57] ABSTRACT

A toy for small children, and which is educational so that the children can learn to spell words and know the alphabet, numbers and colors; the toy consisting of a spelling board divided into ten spelling sections, each of which is of different color, and the toy also including three sets of digits for placement on the spelling sections; one set of digits comprising numbers, another comprising an alphabet set and a third comprising alphabetic letters that spell out colors.

1 Claim, 3 Drawing Figures

SPELL AND LEARN EDUCATIONAL TOY

This invention relates generally to educational toys for young children.

A principal object of the present invention is to provide a toy which teaches the alphabet as well as numbers and colors and their correct spelling to young children.

Another object is to provide a spell and learn educational toy which would allow a three or four year old child to form words, which is an improvement over all the existing inventions of its type, and which would be an excellent educational aid.

Other objects are to provide a spell and learn educational toy which is simple in design, inexpensive to manufacture, rugged in construction, easy to use, and efficient in operation.

These and other objects will be readily evident upon a study of the following specification and the accompanying drawing, wherein.

Figure 1:
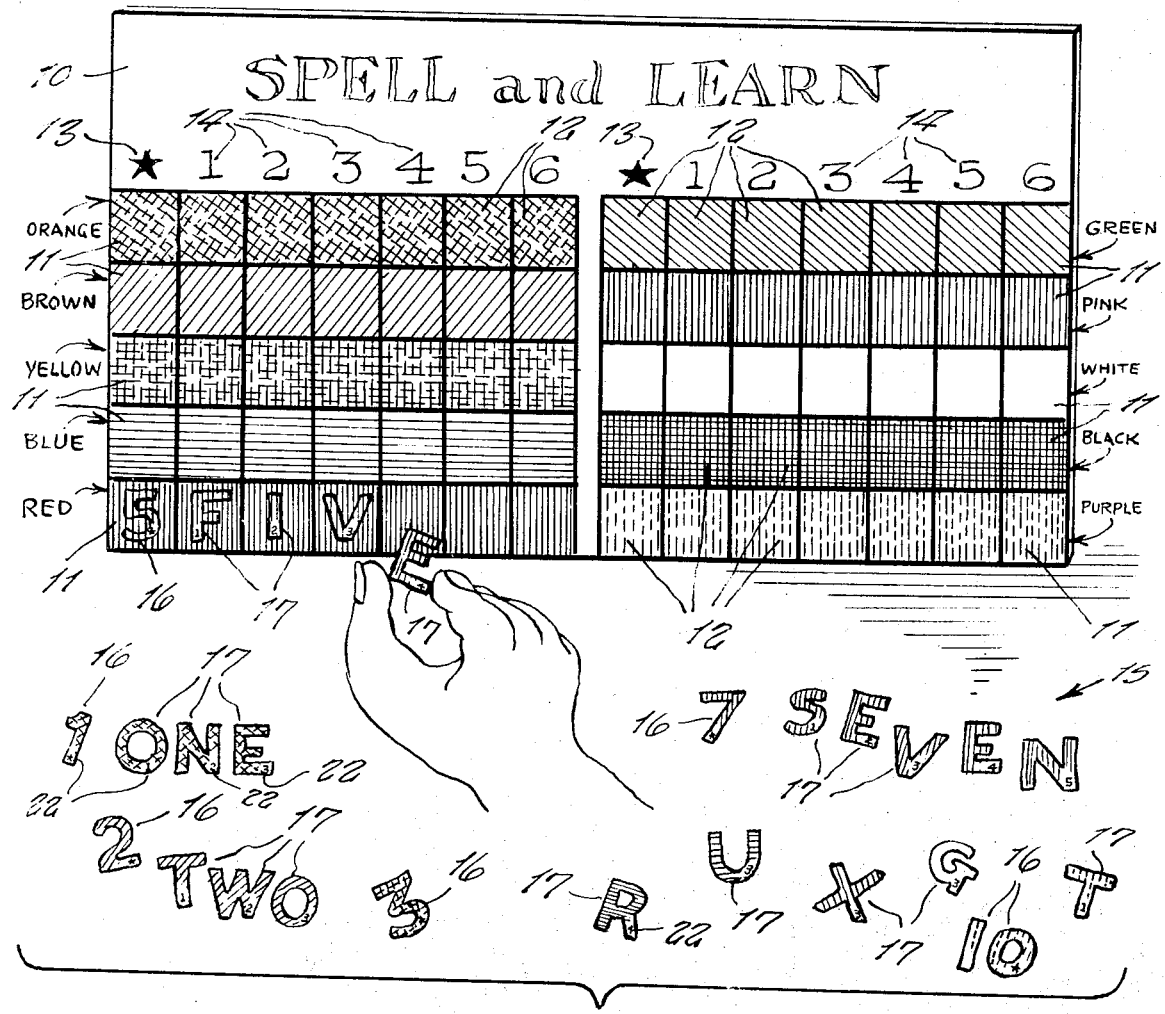
FIG. 1 is a view of the spelling board and a numerals set being placed thereupon.

Referring now to the drawing in detail, the reference numeral 10 represents a spelling board upon which different sets of playing pieces may be placed.

The spelling board comprises a flat rectangular panel which may be made with an easel so that it could be used in upstanding position, or which alternately could lay flat on a horizontal surface. The spelling board has ten spelling sections 11 on its front side, each section being of a different color. Each of the sections is divided into seven horizontal spaces or boxes 12. A star 13 is imprinted over the first vertical row of spaces, and different numerals 14 are imprinted over each of the other vertical rows of spaces.

The playing pieces used for placement upon the spelling board are divided into three sets.

A first set, shown in FIG. 1, consists of numerals set 15 and includes numerical digits 16, and alphabetical characters 17. The digits are intended to be placed in the spaces 12 that are located below the star 13, while the characters 17 are to be placed in the spaces below the printed numbers 14. As is readily evident from an observation of FIG. 1, each of the digits and characters is of a specific color that appears in one of the colors of the sections 11, so it is apparent that the digits and characters are to be placed on sections which are of same color as they. Thus, as shown, the red numeral "5" is placed over the first space of the section 11 that is red in color, and the red characters that spell out "FIVE" are in the next spaces of the same red colored section. Similarly, the orange playing pieces "1" and "ONE" are to be placed on the uppermost orange section, while the brown playing pieces "2" and "TWO" are to go on the brown section 11 located under the orange section, and the like, down to the lowermost right section of purple color on which the purple playing pieces "10" and "TEN" are to be placed.

Figures 2, 3:
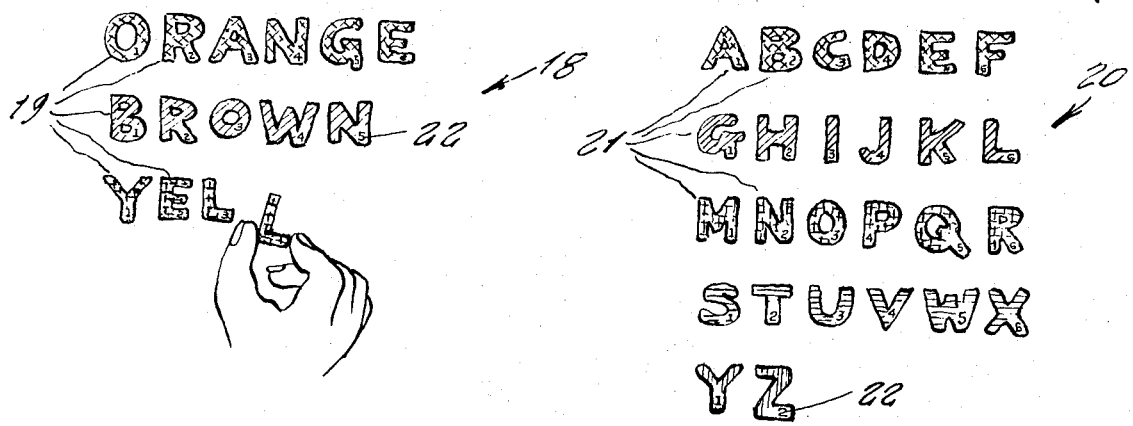
FIG. 2 is a view of a color set for use on the spelling board.
FIG. 3 is a view of an alphabet set for use on the spelling board.

As shown in FIG. 2, a second set of playing pieces comprises a color set 18 in which alphabetical characters 19 which are all of a certain one color will spell out the name of that color. Thus, the five brown characters will spell out the word "BROWN" and which is then placed on the brown colored section 11 of the spelling board.

As shown in FIG. 3, a third set of playing pieces comprises an alphabet set 20 consisting of alphabetical characters 21, in which the first six characters are of orange color so that they are intended to be placed upon the orange section 11. Likewise the next six characters of the alphabet are of brown color so that they belong on the next section which is brown in color. Thus, by grouping the characters, the child learns the approximate position of each letter in the alphabet. Thus, matching of colors aids in teaching.

While various changes may be made in the detail construction, it is understood that such changes will be within the spirit and scope of the present invention as is defined by the appended claims.

An important feature of the invention comprises each numerical digit and alphabetical character having an identification 22 imprinted near the bottom of its front side; this identification indicating to a child into which vertical rows or columns of the spelling board spaces it is to be placed.

Thus in the first set of playing pieces, shown in FIG. 1, the numerical digits 16 each have a star identification so to inform a child that these digits go into the vertical rows which are indicated by the star 13 on top. Likewise each alphabetical character 17 has for its identification a numeral that is the same as the numeral 14 on top of the spelling board vertical row. Thus, in FIG. 1, for further example, the red numeral "5" has a star identification indicating that it goes into the row identified by a star on top. The "F" has a "1" identification so this goes into the row identified by a numeral "1" on top. Thus a child by utilizing the colors and the identifications can properly place any letter on the board. Thus, in the same FIG. 1, it is evident, for example, that the placing piece "R" shown is a blue color and has an identification mark "4". Therefore it is evident that it will be placed on the board into the space four horizontal rows down, and five spaces toward the right.

Likewise the second set of playing pieces shown in FIG. 2, and the third set shown in FIG. 3 have each character provided with an identification, as above described for the first set.

I claim:

1. In a spell and learn educational game, the combination of a spelling board and a plurality of playing pieces for placement on said spelling board, said playing pieces comprising a numerals set, a color set, and an alphabet set, said spelling board having a series of sections, each of which is a different color, each section being divided into spaces each of which is identified by a number, said numerals set comprising a series of numerals and alphabetical characters which are in colors to match the colors of said sections, said color set comprising alphabetic characters to spell out color names and the colors to match the colors of said sections, said alphabet set comprising the characters of a complete alphabet and which are in colors to match the colors of said sections, and each of said playing pieces additionally having an identifying numeral imprinted thereupon so to indicate into which said space of the section it belongs.

* * * * *